Figure 1:
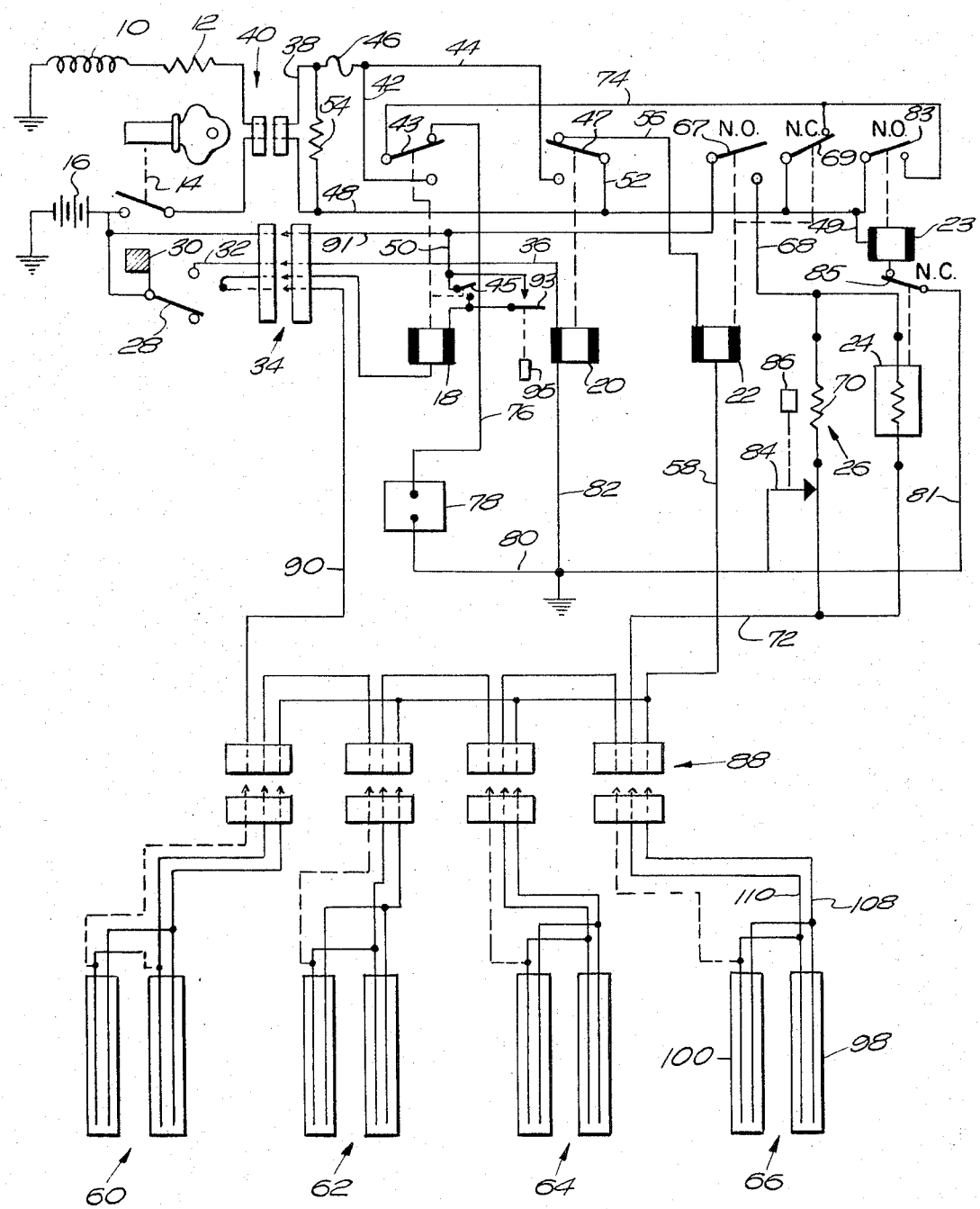

Sept. 26, 1967   J. SHAHEEN   3,343,624
TAXI METER MONITORING SYSTEM
Filed Oct. 22, 1965   2 Sheets-Sheet 1

INVENTOR.
JOHN SHAHEEN
BY Morse, Altman & Oates
ATTORNEYS

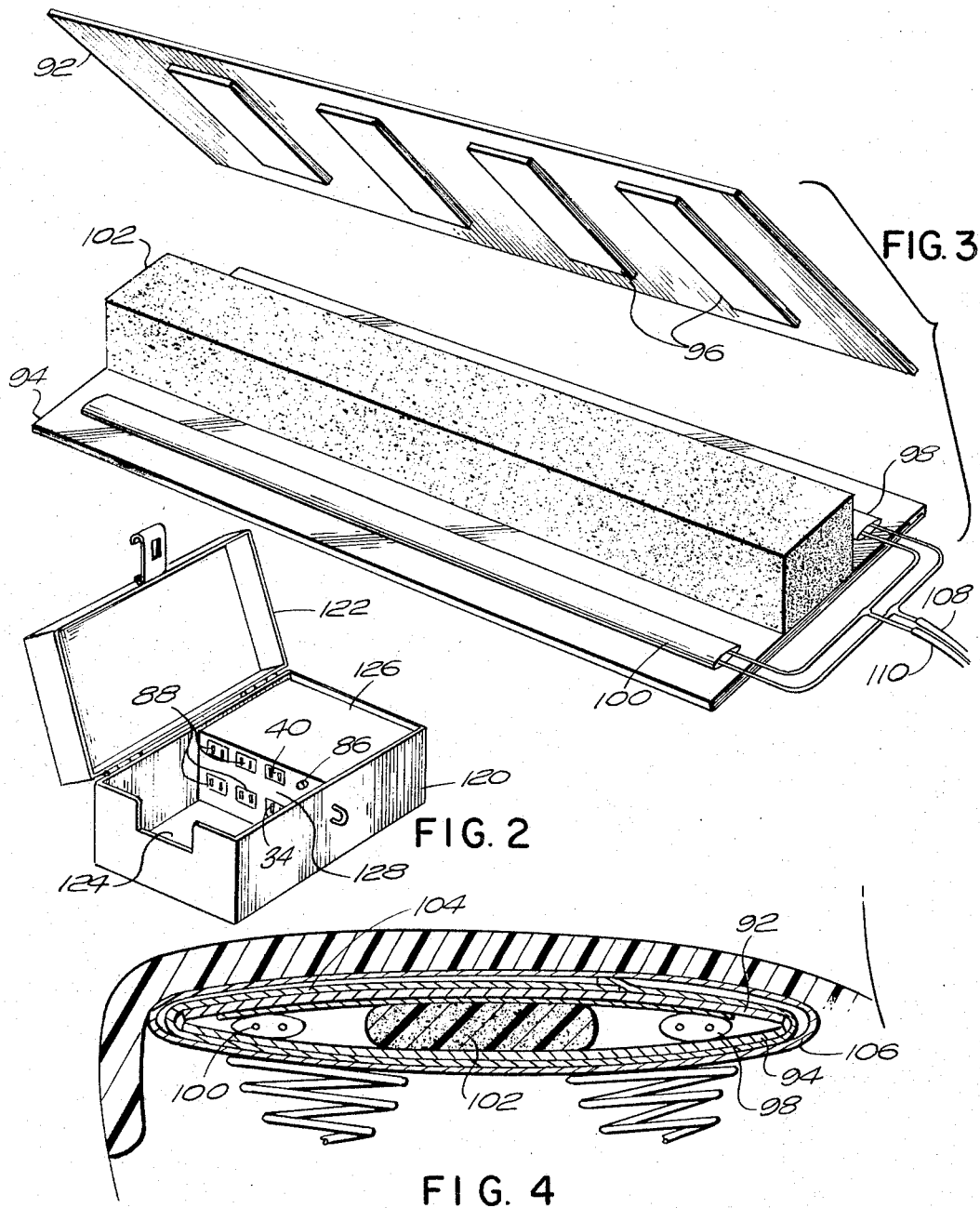

United States Patent Office 3,343,624
Patented Sept. 26, 1967

3,343,624
TAXI METER MONITORING SYSTEM
John Shaheen, 119 Farquhar St.,
Roslindale, Mass. 02131
Filed Oct. 22, 1965, Ser. No. 502,032
12 Claims. (Cl. 180—102)

This invention relates generally to taxi meter monitoring systems and more particularly is directed towards a tamper-proof system for use in monitoring the operation of taxicabs for the purpose of detecting and preventing the transportation of passengers without recording the proper fare.

In the taxi industry there is a rather persistent loss of receipts through cheating by dishonest drivers. This loss of receipts comes about by failure of the driver to turn in all of his collected fares; he instead turns back to the company only the fares recorded on his meter. In practice, the driver may pocket for himself unrecorded fares by charging the passenger a flat rate without turning down the meter flag or he may turn down the meter flag for only a portion of the trip and charge the passenger the meter fare plus an added amount which the driver pockets. In both instances, of course, the scheme calls for cooperation between the driver and the passenger. Whatever the arrangement, the trade has suffered from substantial losses due to unrecorded transportation of cab passengers.

While various systems have been proposed and developed for the purpose of preventing or detecting unauthorized operation of cabs by dishonest drivers, none of these systems has been entirely effective for the purpose intended. With a little ingenuity cabbies and passengers have been able to circumvent these systems in different ways either by disabling them or by avoiding their actuation. For example, cabbies have been able to short-circuit electrical monitoring systems and the passengers have been able to avoid actuating the systems by sitting on the edges of seats in those cabs which employ seat switches or the like to detect the presence of a passenger.

Accordingly, it is an object of the present invention to provide improvements in taxi meter monitoring systems.

Another object of this invention is to provide a taxi meter monitoring system which cannot be disabled without detection.

A further object of this invention is to provide a switching device of tamped proof construction for use in taxicab seats which switching device is sensitive to the weight of a passenger regardless of where the passenger may be sitting on the seat.

More particularly this invention features a taxi meter monitoring system comprising a plurality of switching elements actuated by passengers seating themselves within the cab and operatively connected with a time delay mechanism adapted to disable the cab in the event that the meter is not acuated by the driver within a predetermined period after the passenger is seated. The system features a circuit arrangement to prevent undetected jumping, disconnecting or breaking of the engine disabling portion of the system. This invention also features an improved passenger actuated switching device comprising a pair of strip switches mounted in spaced parallel relation to a semirigid panel. A resilient member is mounted between the two strip switches and a second semi-rigid panel carrying a plurality of trigger elements is compressed against the resilient member with the trigger elements lightly contacting the strip switches. The assembly is mounted in the cab seats between the springs and cushion and the weight of the passenger sitting at any point on the seat is sufficient to cause the trigger elements to bear against either one or both strip switches to actuate the system.

However, these and other features of the invention, along with further objects and advantages thereof, will become more readily apparent from the following detailed description of a preferred embodiment of the invention, with reference being made to the accompanying drawings, in which;

FIG. 1 is a schematic diagram of a taximeter monitoring system made according to the invention, FIG. 2 is a view in perspective of a housing for containing control elements employed in the system, FIG. 3 is an exploded perspective view of an improved switching device made according to the invention, and, FIG. 4 is a sectional end view of a fully assembled switching device of the sort shown in FIG. 3.

Referring now to the drawings and to FIG. 1, in particular, the reference character 10 generally indicates a coil which is part of a taxicab ignition system. In a typical 12 volt ignition system, the coil 10 is connected in series with a resistor 12 for the purpose of reducing the voltage to the coil when the cab is running. In a six volt system this resistor may be eliminated. Energization of the coil 10 is under the control of an ignition switch 14 adapted to close a circuit between a battery 16 and the coil 10 through a monitoring system which includes a series of relays 18, 20, 22, and 23, a thermal time delay switch 24 and a circuit breaker 26. A switch 28, controlled by a flag 30 on the taxi fare meter, is connected in parallel to the ignition switch 14 and is also connected to the coil for the relay 20 through a lead 32, a plug and socket assembly 34, and a lead 36. Lead 38 connects the ignition coil 10 through a plug and socket assembly 40 to a lead 42 connected to one contact of the relay 18 which has two switch arms 43 and 45 which operate simultaneously. Switch arm 43 will be seen to have two operating positions. Lead 44 connects lead 38 to one contact of a switch 47 for the relay 20 which also has two operating positions. A fuse 46 is connected between the lead 38 and leads 42 and 44.

Lead 48 connects the ignition switch 14 through the plug and socket assembly 40 to the coil for the relay 23 by means of lead 49. Lead 48 also connects the ignition switch to the switch arm 47 of relay 20 by lead 52 and to the switch arm 83 of the relay 23. A resistor 54 is connected across leads 38 and 48 for reasons that will presently appear. The opposite contact of the switch 47 for the relay 20 is connected by a lead 56 to the coil for the relay 22. This coil is, in turn, connected by a lead 58 to a series of passenger sensing devices 60, 62, 64 and 66. These passenger sensing devices will subsequently be described in detail.

Relay 22 is provided with two switch arms 67 and 69 the first normally open and the second normally closed. The open contact for the switch 67 for the relay 22 is connected by a lead 68 to the resistor in the thermal delay switch 24 and to a heater coil 70 for the circuit breaker 26 connected in parallel across the time delay switch 24. Lead 72 connects the circuit breaker and the time delay switch to the passenger sensing devices 60, 62, 64 and 66. The switch arm 43 for the relay 18 is connected by a lead 74 to the lead 48 through the normally closed switch arm 69 and to the contact of the normally open switch 83 for the relay 23. The normally closed switch arm 43 for the relay 18 is connected by a lead 76 to an electrical buzzer 78 and thence by a lead 80 to a lead 82 connected to the coil for the relay 20 and to a switch arm 84 for the circuit breaker 26. The switch arm 84 will be seen to be provided with a reset button 86.

All of the passenger actuated switching units are adapted to close when a passenger is seated in the cab.

These switching units typically are provided with plug-in connectors 88 so that individual switching units may be readily replaced when needed. The male components of the plugs are inter-connected between leads 58 and 72 on the one side and a lead 90 on the other side. Lead 90 will be seen to be connected to the plug assembly 34. This is carried through the plug 34 to a dead-end connection and back to the coil for the relay 18. In this fashion, if the meter cable is cut, the buzzer 78 will sound.

The coil for the relay 18 is connected through it own switch arm 45 by lead 50 to a normally live battery lead 91. The relay 18 is also provided with a reset switch 93 and button 95 whereby the relay coil may be energized by simply depressing the button. Relay 18 is maintained in a normally energized condition by means of the live battery lead 91 so that switch arms 43 and 45 will be biased closed. The closed switch 43 thus permits the cab engine to be operated in a normal manner subject to the cabbies' proper operation of the fare meter as will presently appear.

The inclusion of the switch 45 in the circuit for the relay 18 protects against tampering of the circuit. For example, if the plug 34 or any of the plugs 88 are disconnected, the circuit to the coil for the relay 18 will be opened thereby causing the switch 43 to bias from the contact for lead 42 to the contact for the buzzer lead 76 and sounding the buzzer. This will also happen if any of the leads 32, 90 or 91, or those in circuit with them, are cut. Once the buzzer sounds, the cabbie will not be able to stop it insofar as the reset button 95 is located within a locked housing.

To isolate the time delay relay 24 particularly from current produced by an alternator the time delay relay 24 is connected to actuate the relay 23. The relay 23 has its coil connected to lead 48 and by lead 81 to lead 80. The time delay relay is connected to leads 68 and 72.

The relay 23 operates a normally open switch 83 in the primary ignition circuit between leads 48 and 74. Switch 83 closes immediately upon closure of the ignition switch by current passing through the coil of relay 23 from lead 48. This completes a holding circuit for the ignition coil.

The time delay relay 24 controls a switch 85 in the lead 81. When the time delay relay is energized by the seating of a passenger it will open switch 85 after a predetermined period, thereby deenergizing the coil for relay 23 to open switch 83 and stop the cab motor.

The passenger sensing switches are mounted in the rear seat in such a manner that a passenger sitting anywhere on the rear seat will close at least one of the switching elements associated with that seat. Passenger sensing switches are also located on the passenger side of the front seat and under the floor mat over the sloping portion of the fire wall in front of the passenger side of the front seat. This arrangement is provided to prevent passengers from bracing themselves over the front seat to prevent actuating the switches. The switching device may also be added to jump seats for those cabs so equipped. For the jump seat, a mercury switch may be employed to close when the seat is erected.

The system operates in the following manner. In FIG. 1 the circuit is shown in an idle condition with the ignition switch 14 open, the relay 18 deenergized and with no passengers in the cab.

The cab company when installing the system or after servicing will push the reset button 95 to provide a holding circuit to the ignition coil. When the driver turns on the ignition switch 14, the coil 10 will be energized through a circuit formed by the lead 48 through the normally closed switch 69, through the lead 74 and through the switch 43 for the relay 18 which will now be switched to the down position by reason of the relay 18 coil being energized through lead 50. This change of position of the switching portion of the relay 18 will complete the current through the lead 42 to the fuse 46, the lead 38, back through the plug assembly through the resistor 12 to the coil 10. Thus, the engine will be started and the circuit will be maintained in this condition until such time as one or more passengers are taken on board and seats himself in one of the seats to close one or more of the switches 60, 62, 64 or 66.

Assume that the cab driver takes on board one or more passengers, one or more of the switches 60–66 will be closed to complete a circuit to the relay 22 thereby closing the switch associated with that relay. It will be understood that the original closing of the ignition switch 14 will have connected the relay 22 to the live lead 48 through the relay switch 20 by means of lead 56. The relay is energized by any one of the seat switches being closed. This will close the contact for the relay 22 and thereby energize the time delay switch 24 and the circuit breaker 26.

This condition is maintained for a period determined by the delay setting on the time delay switch 24, this switch will time out and open normally closed switch 85 deenergizing the relay 23 and opening switch 83 thus interrupting the circuit to the coil 10 and stopping the cab. Switch 69, it will be understood, will have opened when the passenger is seated. On the other hand if the cab driver turns down his flag 30 so as to close the switch 28 within the preset delay of the switch 24, this will not occur and the circuit to the coil 10 will be kept closed. This is accomplished by the switch 28 which energizes the relay coil 20 when it is closed. Energization of the relay 20 serves to bias the switch arm 47 against the lower contact for the lead 44 thereby completing a circuit from the live line 48 to the lead 44 which connects through the fuse 46 ultimately to the coil 10.

Switch 69 provides a temporary by-pass for relay 23 and its switch 83 to prevent the ignition circuit from being opened by the time delay relay 24 if the meter switch is accidentally opened before the passenger gets out. For example, when the cab reaches its destination the cabbie usually changes the flag position and opens switch 28. If the passenger then delays getting out for any reason, such as paying the fare, the time delay relay 24 may time out to cut the ignition. The by-pass provided by the switch 69 eliminates this problem insofar as the switch 69 will close as soon as the passenger gets up if the meter switch 28 is open.

Referring now more particularly to FIGS. 3 and 4, the passenger actuated switching devices 60–66 will now be described in detail. As shown, each unit comprises a pair of initially flat relatively rigid panels 92 and 94 of a suitable material such as a pressed hardboard, plywood or the like. In practice, each panel is of a rectangular outline and dimensioned according to the location where the unit is to be mounted. For example, if the unit is to be mounted in the back seat of a cab, each panel should be of a length and width corresponding to the length and depth of the rear seat. Typically, each panel would be in the neighborhood of perhaps five feet in length and perhaps a foot and a half to two feet in width for the rear seat. The unit for the passenger side of the front seat will, of course, be shorter by approximately one half than the unit for the rear seat. In any event, each unit comprises the upper panel 92 and the lower panel 94 which, when assembled, are superimposed one upon the other as shown in FIG. 3.

Fixed to the underside of the upper panel 92 is a series of trigger strips 96 arranged in spaced parallel relation transversely of the length of the panel 92. Each trigger strip extends substantially the full width of the panel 92 and typically is fabricated from hard stiff material such as wood, metal, plastic or the like having a slight lateral resiliency. The function of the trigger strips is to actuate one or both of a pair of strip switches 98 and 100 which are bonded lengthwise in spaced parallel relation along the margins of the upper surface of the lower panel 94.

Each strip switch comprises a pair of flexible metal strips each metal strip serving as a circuit contact with the two metal strips mounted in normally spaced relation within a flexible plastic outer sleeve. When any portion of the switch strip is laterally compressed, the two metal strips contact one another at the point of compression thus closing the circuit.

With the present device, the two strip switches 98 and 100 are intended to be actuated by a passenger seating himself upon the taxi seat with the passenger's weight serving to bring one or more of the trigger strips 96 to bear against either one or both of the strips switches 98 and 100. Normally the trigger strips 96 are held in a raised position with their ends slightly apart from the strip switches 98 and 100 by means of a resilient core 102 which, in the preferred embodiment, is an elongated block of foam rubber, foam plastic or the like extending the full length of the panel between the two strip switches and bonded to the upper surface of the lower panel 94. In practice, the resilient block 102 in its normal state is relatively thick in relation to the assembled device. The block is compressed during assembly by means of restraining means such as strips 104, or other means, wound about the outer surfaces of the panels 92 and 94 as best shown in FIG. 4.

It will be understood that in assembling the upper panel 92 it is placed on top of the resilient block 102 and the panel is then compressed down against the block so that the marginal edges of the two panels are joined. In this condition the ends of the trigger strips 96 will be lightly contacting each of the strip switches. The two panels will then be joined by the strips 104 at several points along their length. Once assembled in this manner, the unit will be inserted in a protective outer sleeve or bag 106 with leads 108 and 110 projecting out of the bag for connection with the plug in connectors 88. Once the unit is fully assembled in its protective bag, it is mounted in the cab seats by insertion between the cushion and the springs of the seats as shown in FIG. 4 with the trigger panel 92 being positioned on the upper side next to the cushion.

Employing these units at least one of the strip switches will be closed regardless of where the passenger seats himself. For example, if a passenger should sit on the edge of the seat so as to try to avoid actuating the switches, his weight will rest at least at one point on top of the upper panel thereby pressing the trigger strips against the forward strip switches at least closing that strip switch. This will hold true if the passenger seats himself in the middle or at either end of the seat.

These units may be mounted not only under the rear seat cushion, but also under the passenger side of the front seat and under the rugs of the front seat as previously indicated to prevent a passenger from trying to brace himself on the floor across the edge of the seat.

The passenger sensing device is of low cost construction, simple and rugged and yet extremely sensitive to the weight of a passenger so that it responds no matter how heavy the passenger and regardless of where the passenger may be seated.

The system is foolproof and cannot be bypassed or disabled by the driver without detection. For example, an attempt to bypass the system by connecting a jumper from the battery to the lead for the ignition coil will not work. The resistor 54 is selected so as to have a resistance higher than the ignition circuit but low enough to permit the relays to operate. When a jumper is connected as described above, the lead 48 has a certain voltage on it. The relay 18 will thus be energized and when a passenger sits down, the unit goes through its normal cycle causing the buzzer 78 to sound even though the motor is running by being jumped. With the jumper removed the engine will run only with the flag down but the buzzer still sounds. Insofar as any jumper placed between the battery and lead 38 may burn out the system, the fuse 46 has been installed to prevent accidental or intentional electrical damage to the system. The dead-end connection provided by lead 32 is part of the meter cable so that if the meter cable is cut, the buzzer 78 will sound.

In FIG. 2 there is shown a housing to contain the various relays and protect them against tampering. The housing includes a box portion 120 with a hinged lid 122 which may be locked closed. An opening 124 is provided to accommodate the various leads coming into the unit. The several relays are mounted within an inner section 126 defined by an inner wall 128. The inner wall supports the several female socket connections and also the two reset buttons 86 and 95. Being located within a locked housing it is thus impossible for anyone without access to operate the buttons without forcing open the housing. Any such forcing will, of course, damage the housing and will put the fleet owner on notice of tampering.

While the invention has been described with particular reference to the illustrated embodiment, it will be understood that numerous modifications thereto will appear to those skilled in the art. Accordingly, the above description and accompanying drawings should be taken as illustrative of the invention and not in a limiting sense.

Having thus describing the invention, what I claim and desire to obtain by Letters Patent of the United States is:

1. A monitoring system for a taxicab having a battery, an ignition system, an ignition switch and a meter, comprising
    (a) at least one switching device adapted to be closed by a passenger seated in said cab,
    (b) a meter switch operatively connected to said meter,
    (c) first, second, third and fourth relays,
    (d) a normally closed time delay switch operatively connected to said third relay,
    (e) said first relay being normally energized by said battery and normally forming part of a primary circuit to said ignition system through said fourth relay,
    (f) said second relay adapted to be energized by closing of said meter switch and to thereby complete a secondary circuit to said ignition system,
    (g) said third relay being energized by closing of any one of said passenger switching devices and to thereby actuate said delay switch,
    (h) said delay switch being connected to said fourth relay and responsive to said third relay whereby said primary circuit will be opened after a predetermined period.

2. A monitoring system according to claim 1, including a fuse connected in said circuit between said relays and said ignition system.

3. A monitoring system according to claim 1 including a resistance connected in parallel between leads for said primary and secondary circuits.

4. A monitoring system for a taxicab having a battery, an ignition system, an ignition switch and a meter, comprising
    (a) at least one switching device adapted to be closed by a passenger seated in said cab,
    (b) a meter switch operatively connected to said meter,
    (c) first, second and third relays,
    (d) normally closed time delay switch means operatively connected to said third relay,
    (e) said first relay being normally energized by said battery and forming part of a primary circuit to said ignition system through said delay switch means,
    (f) said second relay adapted to be energized by closing of said meter switch and to thereby complete a secondary circuit to said ignition system,
    (g) said third relay being energized by closing of any one of said passenger switching devices and to thereby actuate said delay switch,
    (h) said delay switch means being responsive to said third relay adapted to open said primary circuit after a predetermined period, (i) each of said passenger switching devices comprising a pair of superimposed panels, switching elements mounted along margins of one of said panels, and a resilient member disposed between said elements whereby pressure applied against the other of said panels will actuate at least one of said elements.

5. A monitoring system according to claim 4 including a fourth relay responsive to said time delay relay means and adapted to close said primary circuit upon closing of said ignition switch and to open said primary circuit upon operation of said time delay switch.

6. A monitoring system according to claim 4 including resistance means connected in parallel between said relays and said ignition system.

7. A monitoring system according to claim 4 including a signal device operatively connected to said first relay and adapted to be actuated upon the deenergization of said first relay.

8. A switching device, comprising
 (a) a pair of relatively stiff panels of corresponding size and shape mounted in superimposed relation,
 (b) a resilient member compressed between said panels and urging said panels apart,
 (c) trigger members mounted on the inner face of one of said panels,
 (d) elongated flexible switching members mounted on the inner face of the other of said panels oppositely said trigger members whereby at least one of said switching members will be closed when contacted by one of said trigger members.

9. A switching device according to claim 8 wherein said resilient member includes a section of rubberlike material of normally substantial thickness.

10. A switching device, comprising
 (a) a pair of relatively stiff rectangular panels of corresponding size,
 (b) connecting means for joining the opposing long edges of said panels in superimposed relation,
 (c) a resilient member compressed between said panels and urging said panels apart,
 (d) elongated trigger members mounted in spaced parallel relation on the inner face of one of said panels and transversely thereof,
 (e) elongated flexible switching members mounted in spaced parallel relation along the margins on the inner face of the other of said panels lengthwise thereof oppositely said trigger members whereby at least one of said switching members will be closed by one or more of said trigger members pressing against said switching member upon pressure applied to one of said panels.

11. A monitoring system for a taxicab having a battery, an ignition system, an ignition switch and a meter comprising
 (a) at least one switching device adapted to be closed by a passenger seated in said cab,
 (b) a meter switch operatively connected to said meter,
 (c) a two pole first, a one pole second, a two pole third, and one pole fourth relay,
 (d) a normally closed time delay switch operatively connected to said third relay and adapted to actuate said fourth relay,
 (e) said first relay being normally energized through one of its poles and forming a primary circuit through another of its poles to said ignition system through said fourth relay pole, when said ignition switch is closed,
 (f) said second relay adapted to be energized by closing of said meter switch to thereby complete an alternate circuit to said ignition system through the pole of said second relay,
 (g) said third relay being energized by closing of any one of said passenger switching devices and to thereby actuate said delay switch,
 (h) said delay switch being adapted to open said primary circuit after a predetermined period.

12. A monitoring system according to claim 11 wherein one of the poles for said third relay forms part of a by-pass circuit to said ignition system while said meter switch and said passenger switching devices are open.

References Cited

UNITED STATES PATENTS

| 2,610,268 | 9/1952 | Hamilton | 200—61.43 |
| 2,792,901 | 5/1957 | Butler | 180—82 |
| 3,133,167 | 5/1964 | Miller | 200—61.43 |
| 3,193,044 | 7/1965 | Butler | 180—82 |
| 3,305,724 | 2/1967 | Shaheen | 180—82 |

KENNETH H. BETTS, *Primary Examiner.*